(12) United States Patent
Flusche et al.

(10) Patent No.: US 10,644,432 B1
(45) Date of Patent: May 5, 2020

(54) CONNECTOR ASSEMBLY

(71) Applicant: Ameristar Perimeter Security USA Inc., Tulsa, OK (US)

(72) Inventors: Benton P. Flusche, Tulsa, OK (US); Nathan T. Haney, Owasso, OK (US)

(73) Assignee: Ameristar Perimeter Security USA Inc., Tulsa, OK (US)

( * ) Notice: Subject to any disclaimer, the term of this patent is extended or adjusted under 35 U.S.C. 154(b) by 0 days.

(21) Appl. No.: 16/290,987

(22) Filed: Mar. 4, 2019

Related U.S. Application Data

(60) Provisional application No. 62/638,577, filed on Mar. 5, 2018.

(51) Int. Cl.
*H01R 9/26* (2006.01)
*H01R 13/50* (2006.01)
*H01R 12/70* (2011.01)

(52) U.S. Cl.
CPC ......... *H01R 13/50* (2013.01); *H01R 12/7005* (2013.01)

(58) Field of Classification Search
CPC ...... H01R 9/26; H01R 9/2675; H01R 9/2408; H01R 27/00; H01R 103/00
USPC ..... 439/716, 218, 715, 717, 222; 307/43, 32
See application file for complete search history.

(56) References Cited

U.S. PATENT DOCUMENTS

| | | | | |
|---|---|---|---|---|
| 8,730,670 B1* | 5/2014 | Zohni | ................... | H01L 23/367 361/690 |
| 2006/0214149 A1* | 9/2006 | Hung | .................. | E04H 17/1443 256/22 |
| 2007/0080334 A1* | 4/2007 | Perry | .................. | E04H 17/1413 256/67 |
| 2008/0038048 A1* | 2/2008 | Pingel | ................... | E01F 13/022 403/24 |

* cited by examiner

*Primary Examiner* — Phuong Chi Thi Nguyen
(74) *Attorney, Agent, or Firm* — Gary Peterson

(57) ABSTRACT

A connector assembly is used to attach the end of a horizontal rail to the supporting vertical post of a barrier. A flat platform is secured to the side wall of the post. A channel-shaped bracket having a convex base is seated within a concavity formed in the platform. A convex retainer is seated within the concave base of the bracket channel. A bolt extends through aligned openings formed in each of the platform, bracket and retainer. The bolt also extends through aligned openings in the post. The end of a rail is installed within the bracket channel, and held in place by a bolt. An elongate opening formed in the bracket base allows the bracket to swivel horizontally to a desired angular position. The bracket permits a single post to support adjacent sections of a barrier that intersect at a non-straight angle.

20 Claims, 11 Drawing Sheets

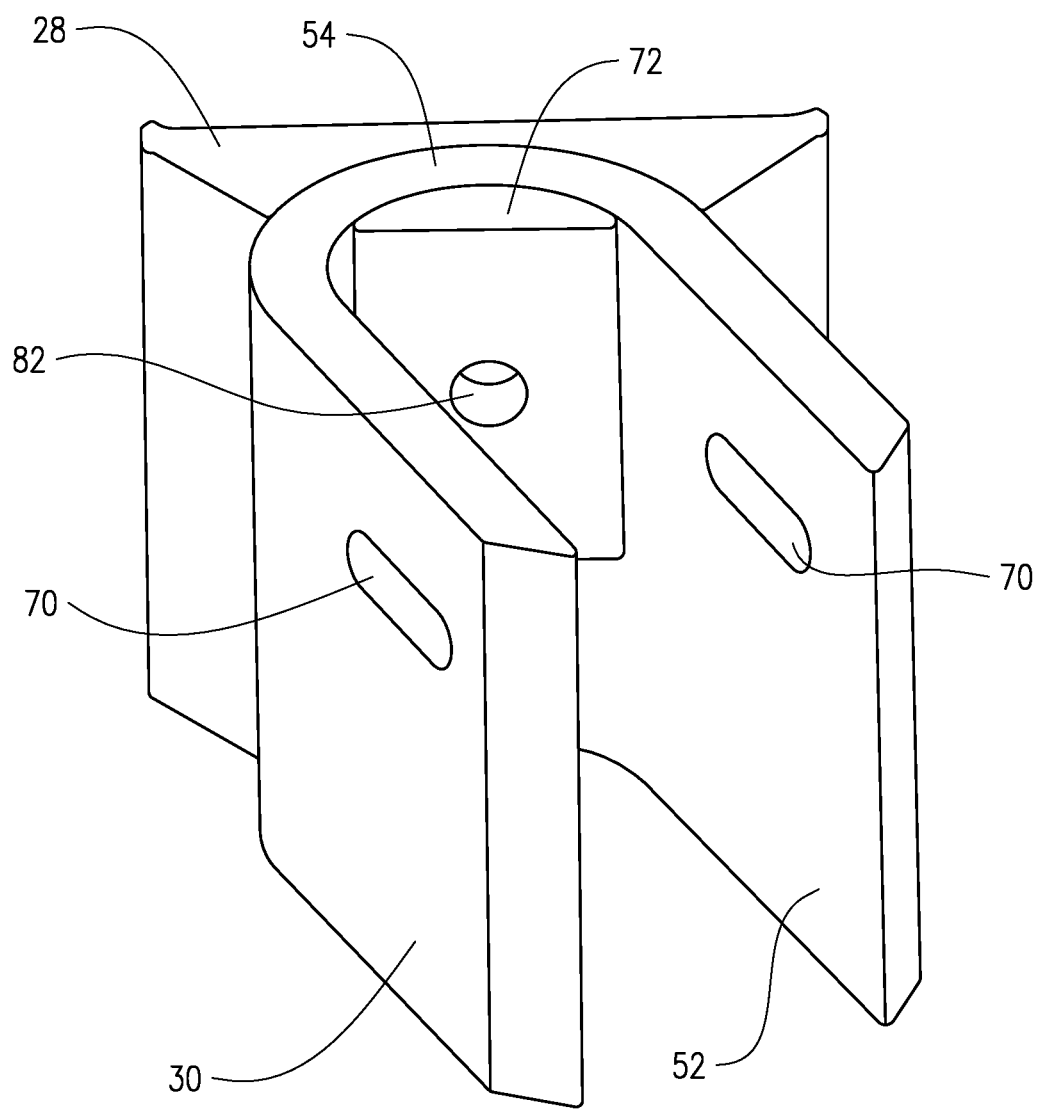

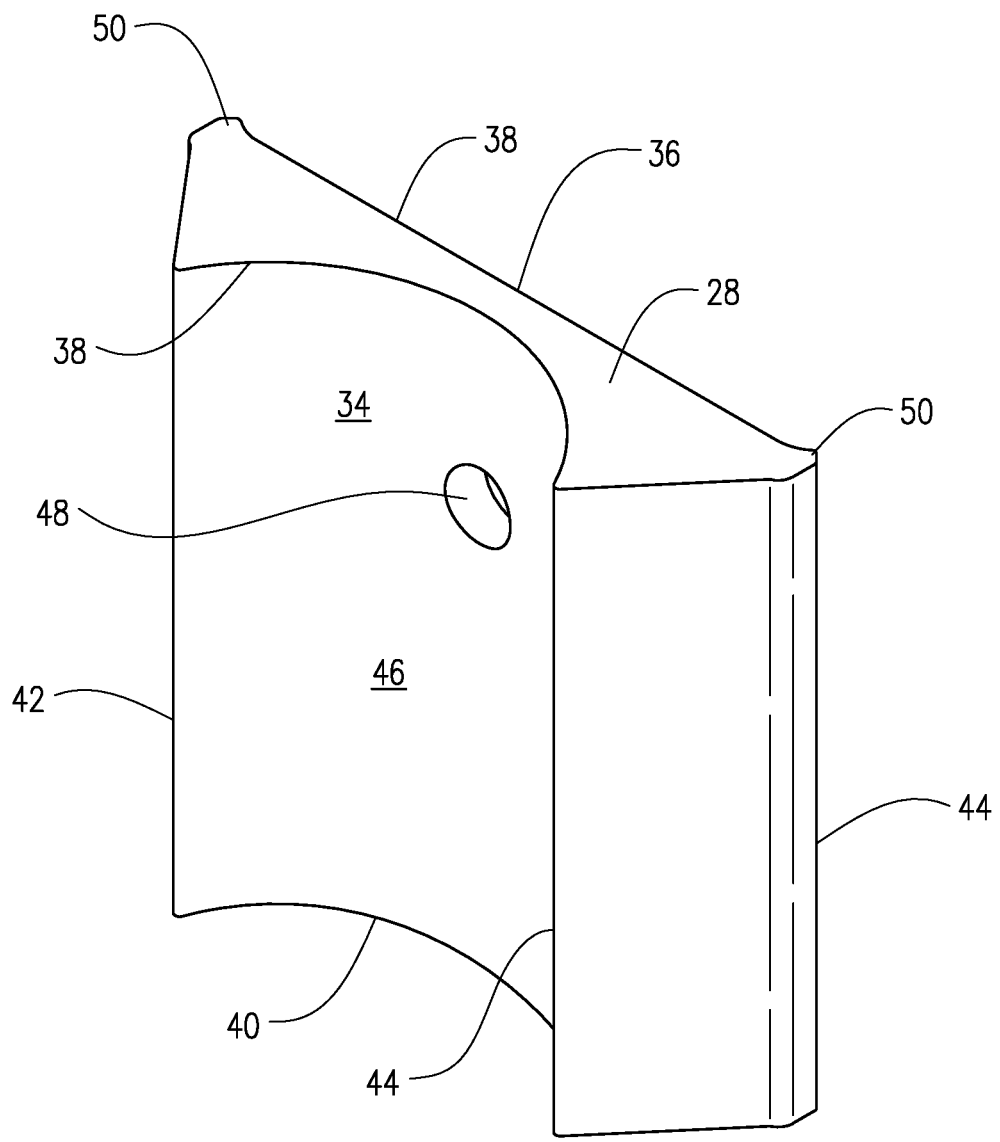

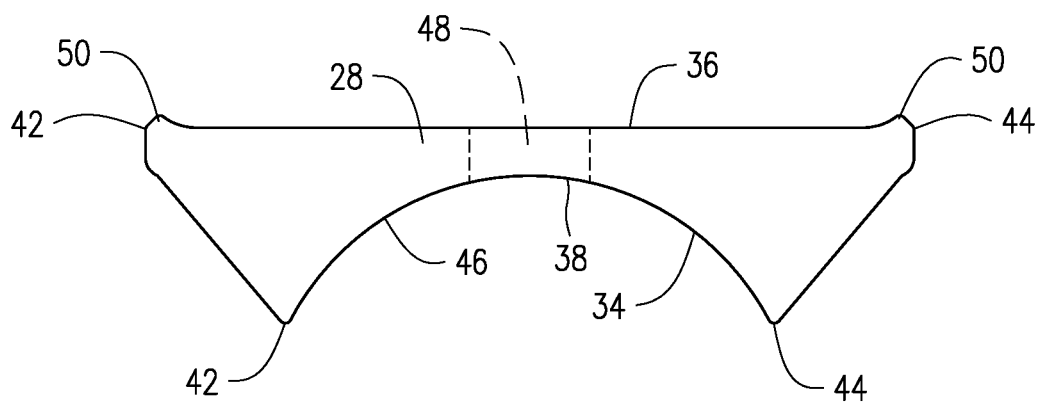
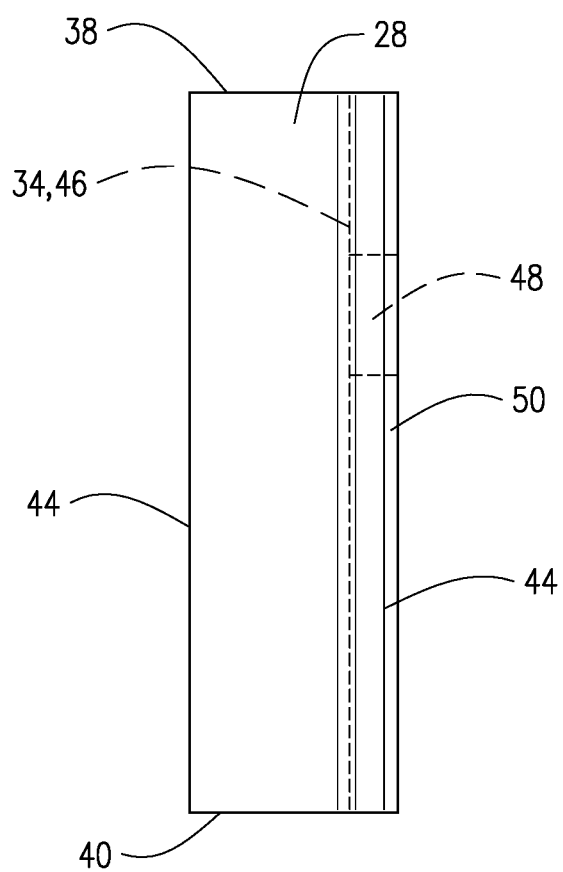
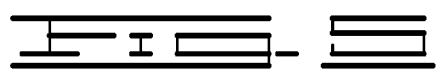

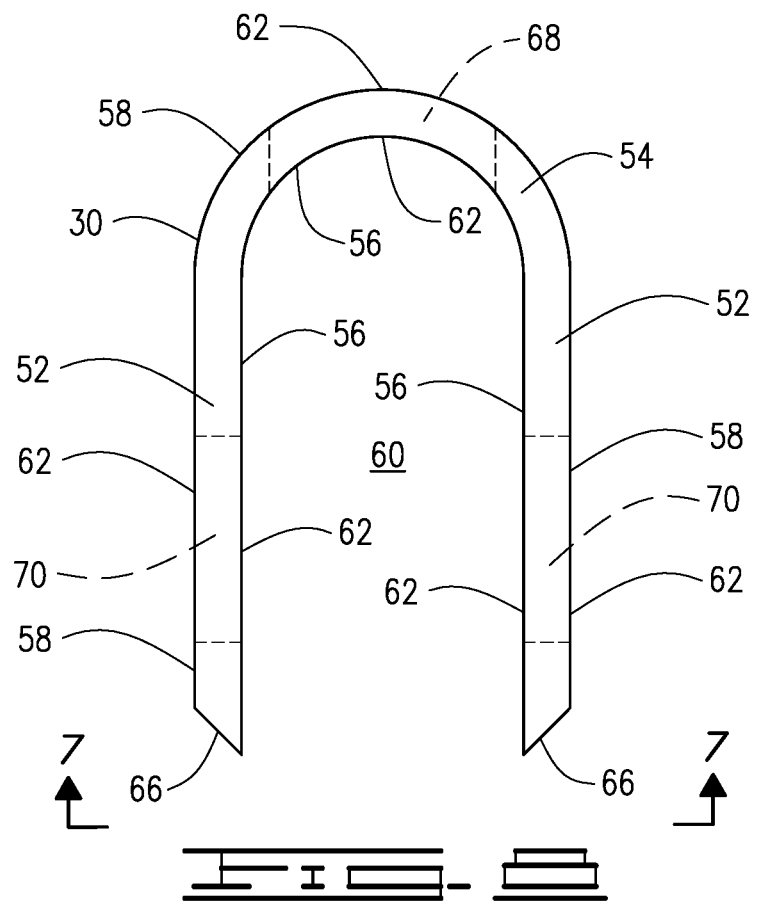
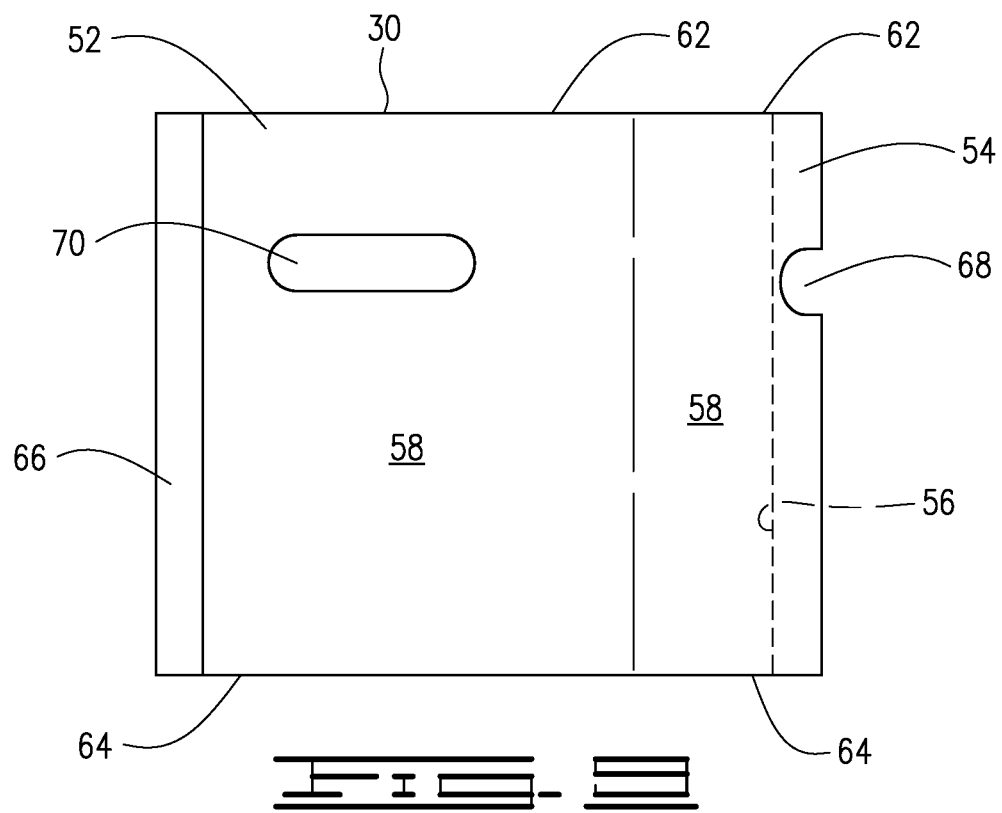

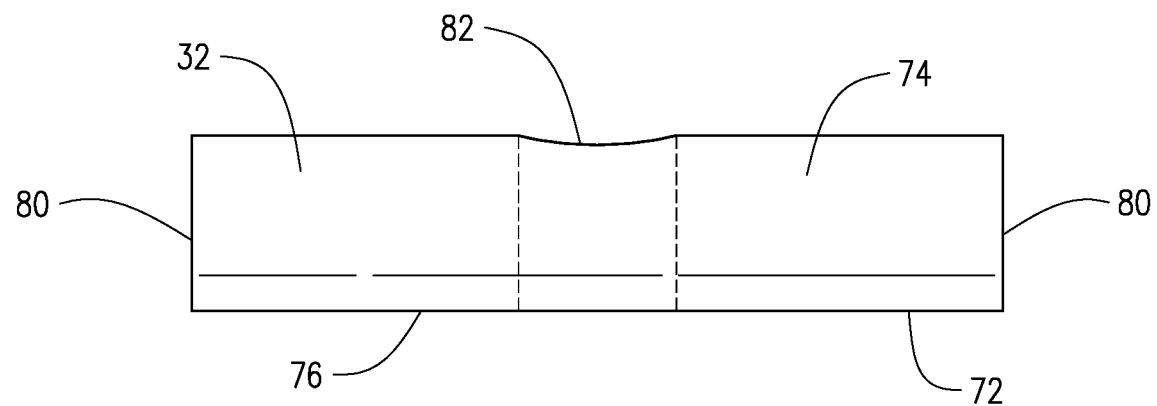
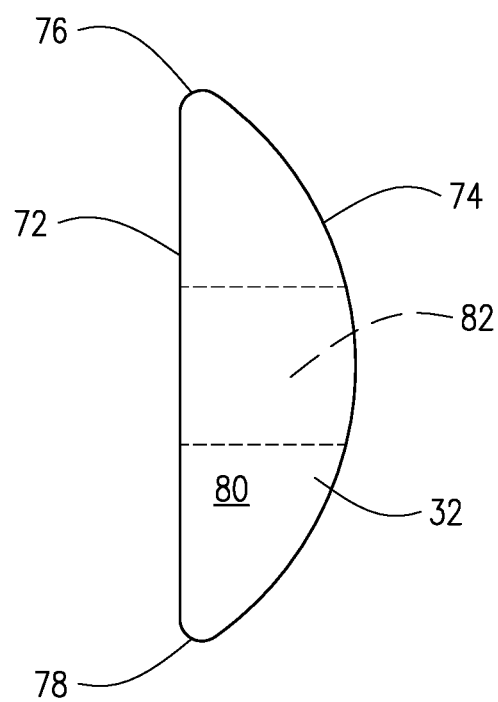
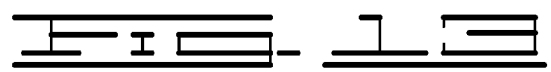

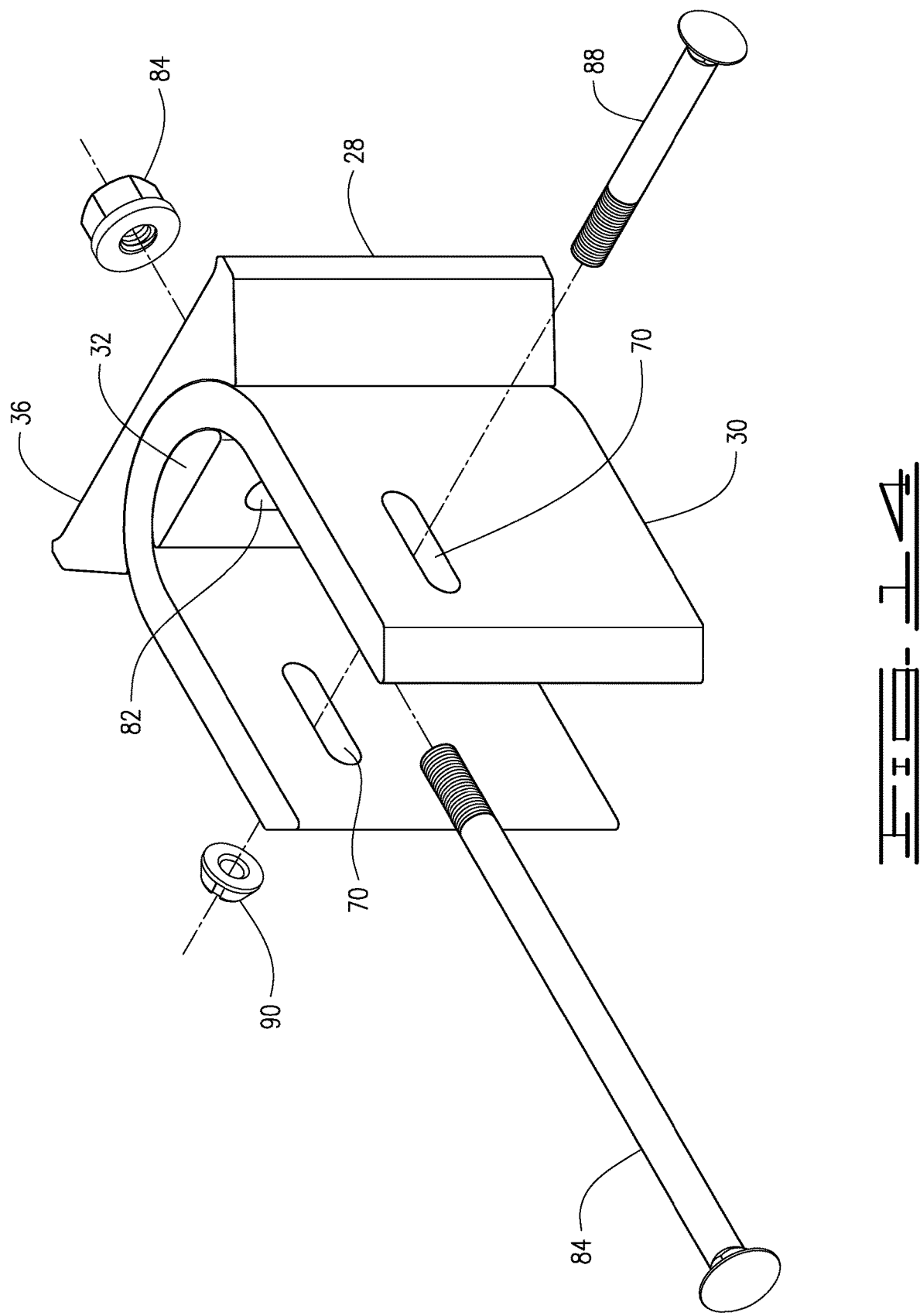

CONNECTOR ASSEMBLY

SUMMARY OF THE INVENTION

A kit is formed from a platform, a channel-shaped bracket and a retainer. The platform has a concavity formed within it. The bracket has a pair of side walls joined by a base, and opposed convex and concave surfaces. The convex surface of the bracket is seatable within the concavity of the platform. The retainer is receivable within the bracket channel and has a convex surface seatable within the concave surface of the base of the bracket.

BRIEF DESCRIPTION OF THE DRAWINGS

FIG. 1 is a perspective view of a connector assembly.
FIG. 2 is a perspective view of a platform.
FIG. 4 is a top plan view of the platform shown in FIG. 3, taken along line 4-4.
FIG. 5 is a side elevation view of the platform shown in FIG. 3, taken along line 5-5.
FIG. 8 is a top plan view of the bracket shown in FIG. 7, taken along line 8-8.
FIG. 9 is a side elevation view of the bracket shown in FIG. 7, taken along line 9-9.
FIG. 12 is a top plan view of the retainer shown in FIG. 11, taken along line 12-12.
FIG. 13 is a side elevation view of the retainer shown in FIG. 11, taken along line 13-13.
FIG. 14 is an exploded perspective view of a connector assembly and its associated fasteners.

DETAILED DESCRIPTION

Figure 3:
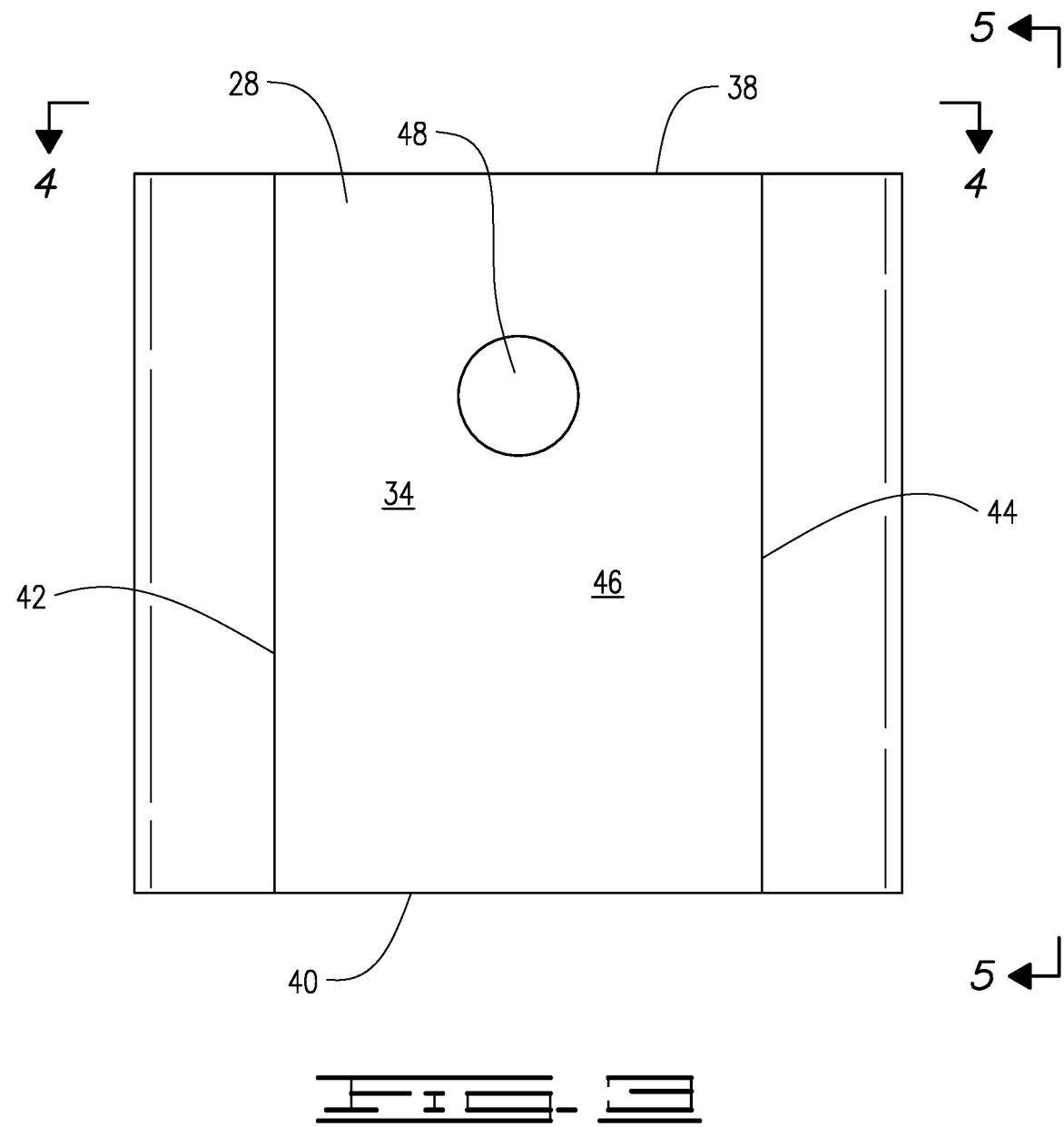
FIG. 3 is a front elevation view of the platform shown in FIG. 2.
Figure 6:
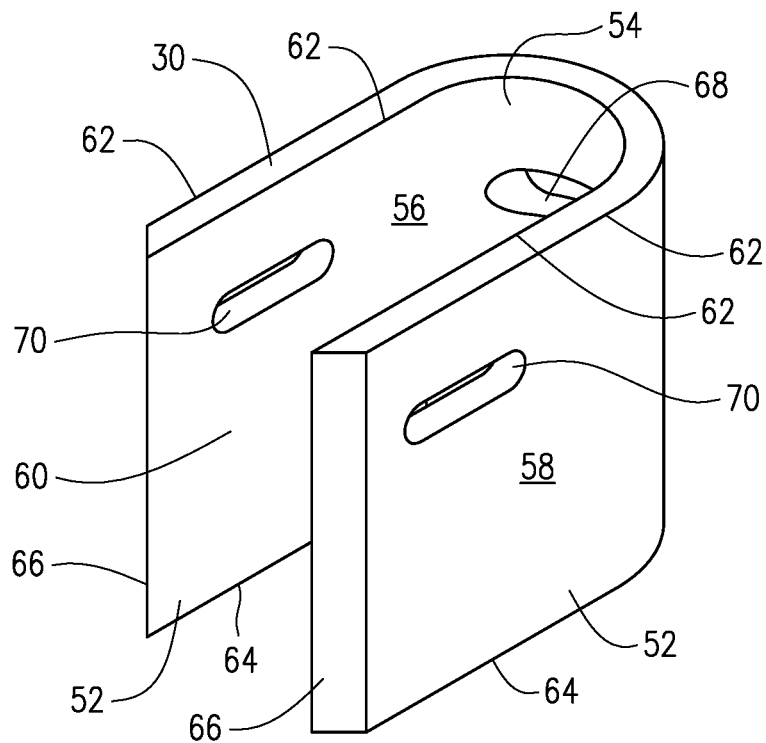
FIG. 6 is a perspective view of a bracket.
Figure 7:
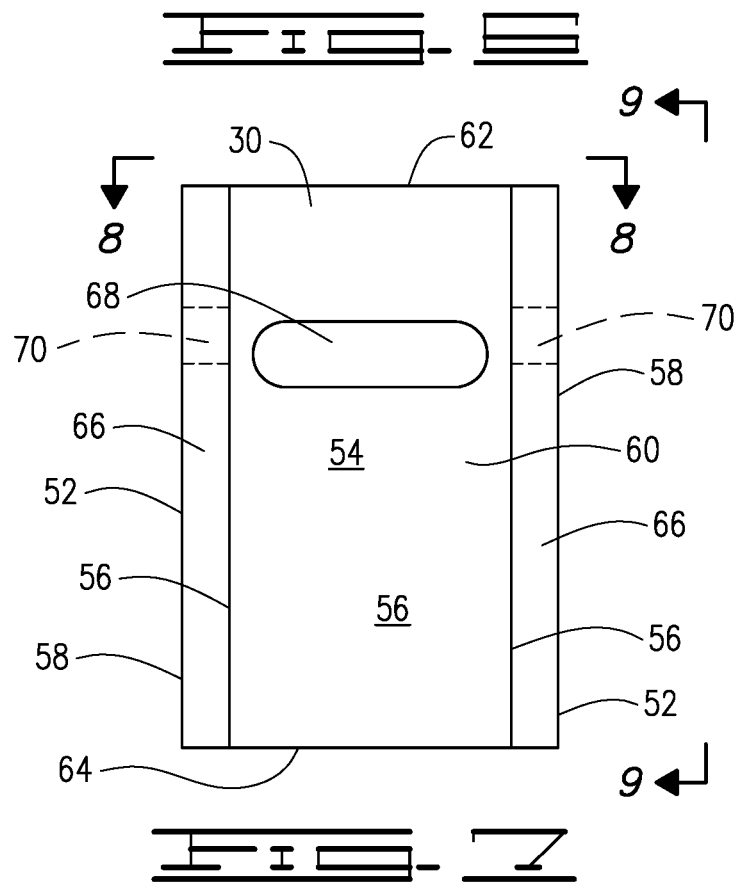
FIG. 7 is a front elevation view of the bracket shown in FIG. 6.
Figure 10:
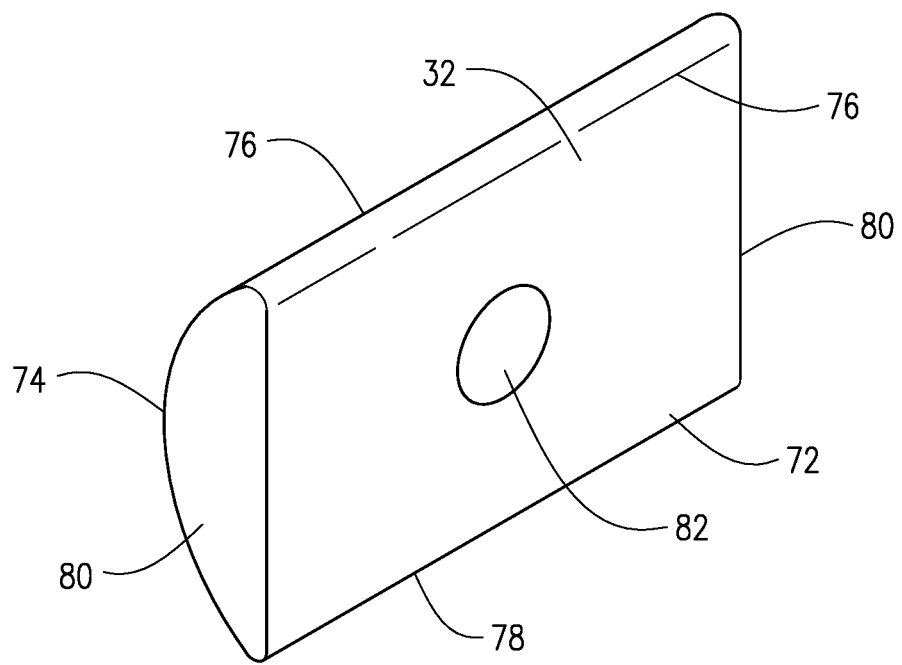
FIG. 10 is a perspective view of a retainer.
Figure 11:
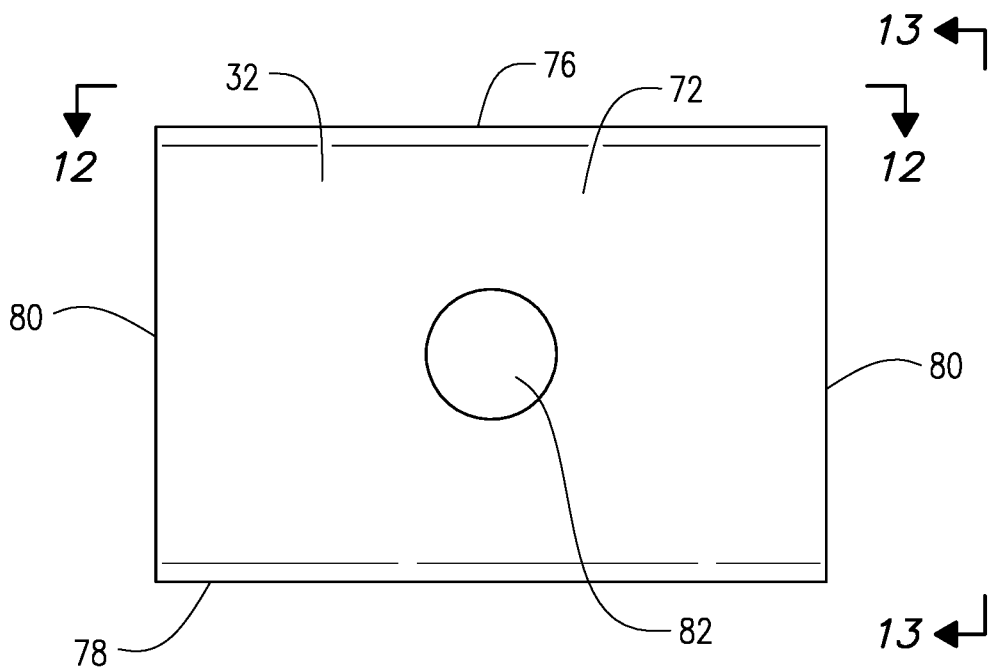
FIG. 11 is a front elevation view of the retainer shown in FIG. 10.
Figure 15:
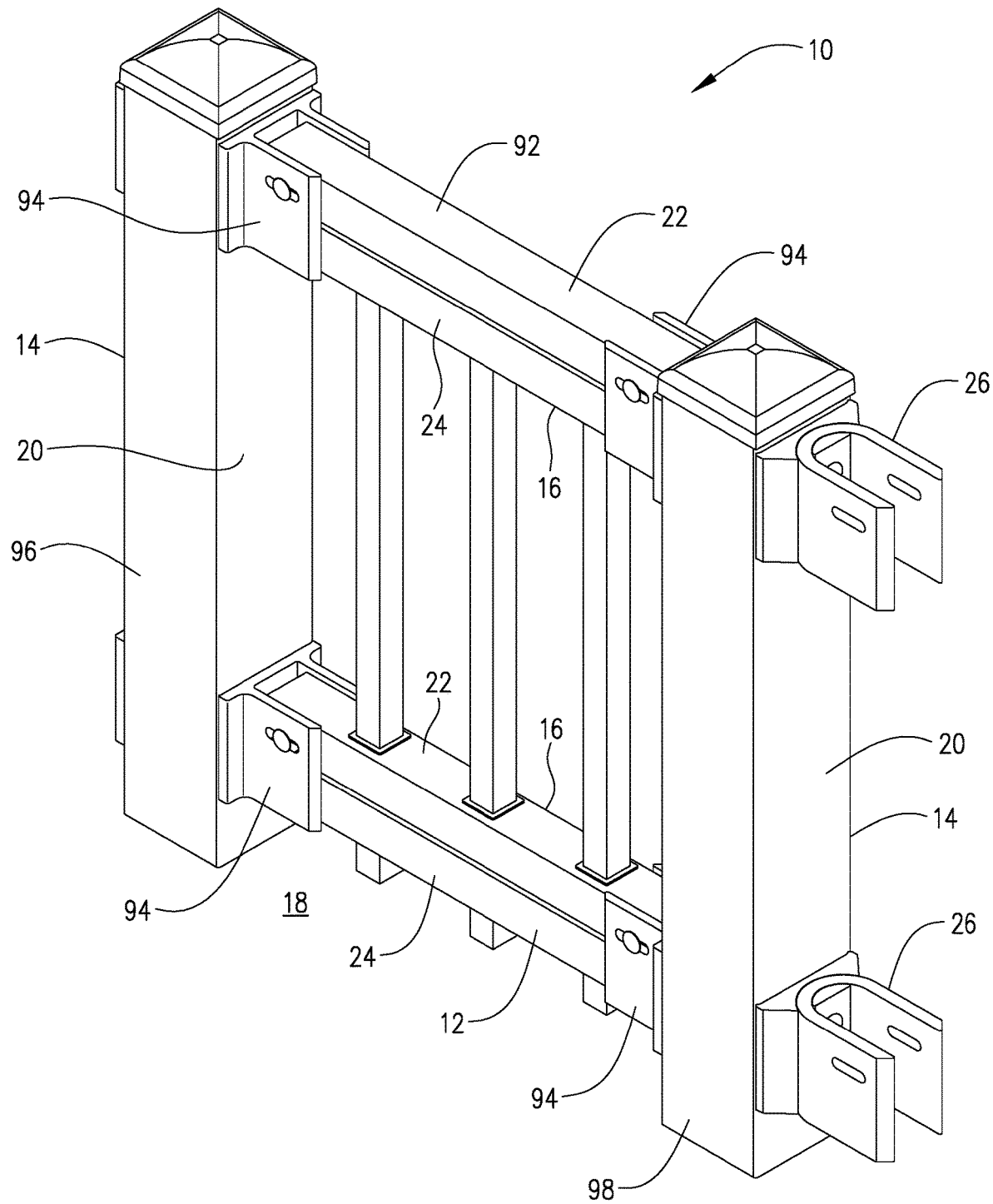
FIG. 15 is a perspective view of a portion of a partially assembled barrier that includes the connector assemblies of FIG. 1.
Figure 16:
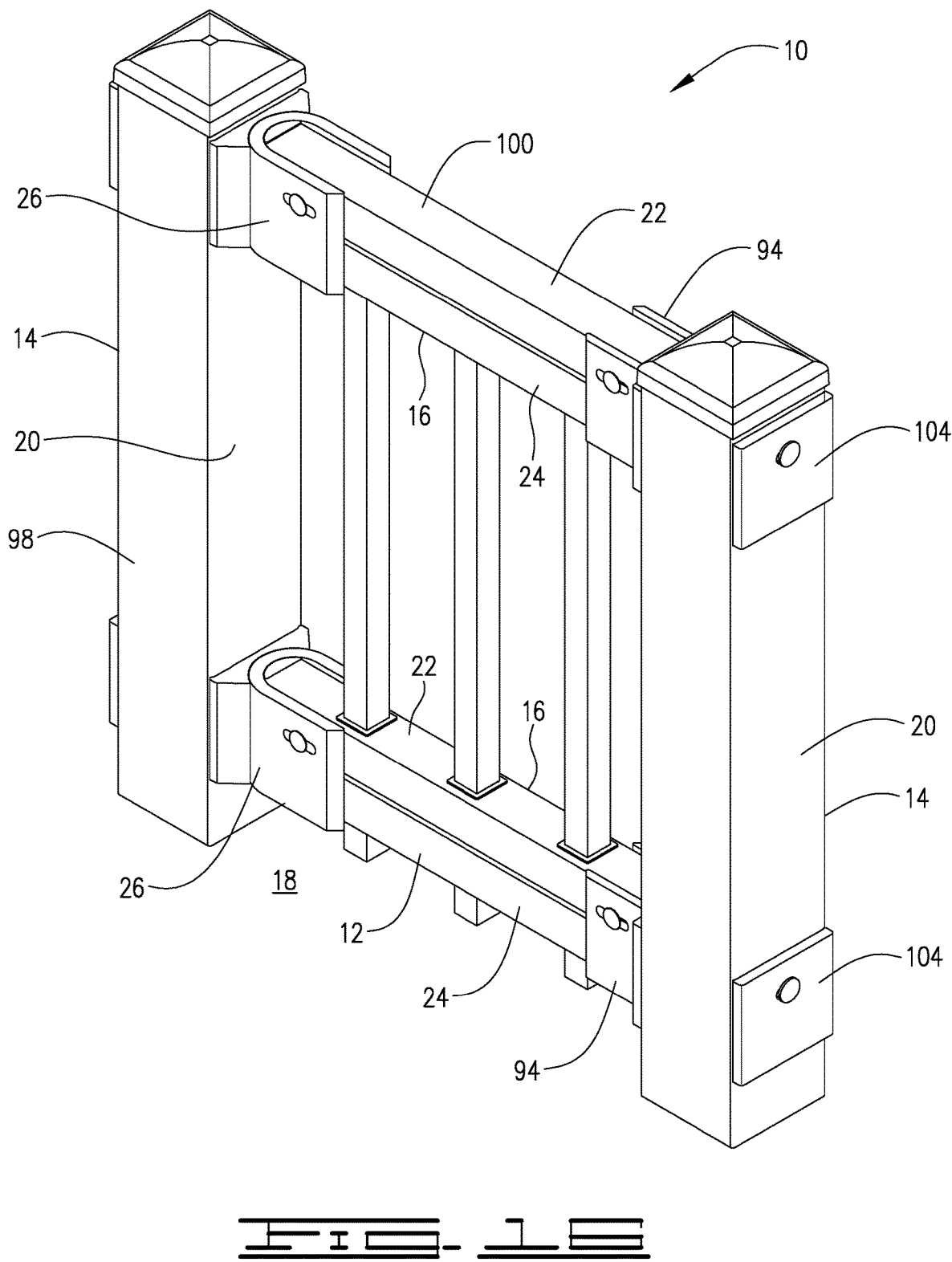
FIG. 16 is a perspective view of a portion of an assembled barrier that includes the connector assemblies of FIG. 1.

A barrier 10, such as a fence, is formed from a plurality of sections 12. One such section 12 is shown in FIGS. 15 and 16. Each section 12 comprises a pair of adjacent vertical posts 14. A plurality of transversely extending horizontal rails 16 interconnects the posts 14. Preferably, adjacent sections 12 share the same single post 14 at their junction.

The posts 14, which are preferably identical, are formed from a strong and durable material, such as steel. Each post 14 is embedded at its base within a substrate 18, such as the ground. Included in each post 14 is at least one, and preferably a plurality of side walls 20. Preferably, each side wall 20 is flat. In one embodiment, each post 14 has a rectangular, and more preferably a square, cross-sectional profile.

The rails 16, which are preferably identical, are formed from a strong and durable material, such as steel. Each rail 16 is an elongate structure having a flat upper web 22 that interconnects a pair of opposed, parallel and flat side walls 24. In one embodiment, each rail 16 comprises a pair of identical inverted U-shaped channels that open in the same direction. One channel is stacked atop the other, such that the base of the upper channel engages the web of the lower channel. The two channels are permanently joined, preferably by welding. The web of the upper channel functions as the web 22.

Each section 12 of the barrier 10 further comprises one or more connector assemblies 26. Each connector assembly 26 joins an end of a rail 16 to the post 14 that supports that end. As shown in FIG. 1, each connector assembly 26 comprises a platform 28, a bracket 30, and a retainer 32.

The platform 28 is shown in detail in FIGS. 2-5. The platform 28 is a wedge-shaped member of compact shape. The platform 28 is characterized by a front face 34 and an opposed rear face 36, each preferably having a rectangular footprint. Each of the faces 34 and 36 extends between an upper edge 38 and a lower edge 40, and between a first side edge 42 and a second side edge 44. The upper and lower edges 38 and 40 are preferably rectilinear and parallel, as are the first and second side edges 42 and 44.

Formed within the front face 34 is a concavity 46. The concavity 46 is preferably complementary in shape to the curved surface of a sector of a right circular cylinder. The axis of that sector extends between a pair of parallel planes that respectively contain the upper edge 38 and lower edge 40 of the front face 34. The concavity 46 may occupy the entirety of the front face 34, as shown in the Figures, or may occupy some lesser portion thereof.

At the rear face 36, the spacing of the first and second side edges 42 and 44 preferably equals the width of the side wall 20 that will support the platform 28. An elongate projecting ridge 50 is formed on each side of the rear face 36 at the side edges 42 and 44. The ridges 50 permit the platform 28 to better grip the side wall 20 during and after installation.

Between the ridges 50, and between the upper and lower edges 38 and 40, the rear face 36 is preferably flat. A compact opening 48 penetrates the platform 28 at a location spaced from its edges. The opening 48 interconnects the front and rear faces 34 and 36, and preferably has a circular cross-sectional shape.

In one embodiment of the platform 28, the distance between the upper and lower edges 38 and 40 of the rear face 36 is 3.75 inches. The distance between the first and second side edges 42 and 44 of the rear face 36 is 4.00 inches. The minimum distance between the rear face 36 and a plane containing the first and second side edges 42 and 44 of the front face 34 is 1.02 inches. Opening 48 has a diameter of 0.44 inches. At the rear face 36, the center of opening 48 is spaced 2.00 inches from each of the side edges 42 and 44, and 1.13 inches from the upper edge 38. The concavity 46 has a radius of 1.41 inches.

The bracket 30, shown in detail in FIGS. 6-9, is a unitary channel-shaped member of uniform thickness. The bracket 30 has a pair of side walls 52 joined by a base 54, and is bounded by an inner surface 56 and an opposed outer surface 58. The side walls 52 and base 54 cooperate to define a channel 60. Each of the surfaces 56 and 58 has an upper edge 62 and a lower edge 64. Each side wall 52 terminates in a free end 66, which is preferably beveled with respect to the inner and outer surfaces 56 and 58. At the side walls 52, the inner and outer surfaces 56 and 58 are each planar.

At the base 54, the inner surface 56 is concave and the outer surface 58 is convex. The convex outer surface 58 of the base 54 is seatable within the concavity 46 of the platform 28. The outer surface 58 is curved at the base 54, and more preferably is the curved surface of a sector of a right circular cylinder. The axis of that sector extends between a pair of planes respectively containing the upper edge 62 and the lower edge 64 of the outer surface 58. The radius of the outer surface 58 within the base 54 is either equal to, or slightly less than, the radius of the concavity 46. Within the base 54, the inner surface 56 is complementary in shape to the curved surface of another sector of a right circular cylinder. The axis of that sector extends between a pair of planes respectively containing the upper edge 62 and the lower edge 64 of the inner surface 56.

An elongate opening 68 formed within the base 54 interconnects the inner and outer surfaces 56 and 58. The opening 68 is a generally rectangular slot that extends along a curved path parallel to the upper and lower edges 62 and 64. Preferably the opening 68 is provided with rounded ends. The minor dimension of the opening 68 preferably equals the major dimension of the opening 48. The opening 68 is situated such that it is alignable with the opening 48.

An elongate fastener opening 70 is formed in at least one side wall 52 of the bracket 30, and preferably in each such side wall 52. Each fastener opening 70 is generally rectangular in shape, and extends parallel to the upper and lower edges 62 and 64. Preferably each fastener opening 70 is provided with rounded ends. The fastener openings 70 are aligned, of identical size and shape, and positioned at the same distance from the upper edge 62.

In the same embodiment described with reference to the platform 28, the bracket 30 has a thickness of 0.31 inches. The height of the bracket 30, measured between upper and lower edges 62 and 64, is 3.75 inches. The ends 66 have a separation distance of 1.88 inches at the inner surface 56. At the base 54, the radius of the inner surface 56 is 0.94 inches, while the radius of the outer surface 58 is 1.25 inches. At each beveled end 66, the inner surface 56 extends 0.31 inches beyond the outer surface 58. At the inner surface 56, the length of each side wall 52, measured between the end 66 and the base 54, is 2.87 inches. The maximum length of the bracket 30, measured between the inner surface 56 at end 66 and the outer surface 58 at the deepest part of the base 54, is 4.4 inches.

In the same embodiment, the opening 68 has a major dimension of 1.56 inches, and a minor dimension of 0.44 inches. Each fastener opening 70 has a major dimension of 1.38 inches and a minor dimension of 0.38 inches. At the inner surface 56, the center of each fastener opening 70 is situated 1.44 inches from the end 66.

The retainer 32 is shown in detail in FIGS. 10-13. The retainer 32 has the shape of a sector of a right circular cylinder, and is receivable within the channel 60. The retainer 32 is characterized by a flat front face 72 and a curved and convex rear face 74. The rear face 74 is seatable within the concave inner surface 56 of the bracket 30. The radius of the rear face 74 is either equal to, or slightly less than, the radius of the inner surface 56 of the base 54 of the bracket 30.

Each of the faces 72 and 74 extends between an upper edge 76 and a lower edge 78. The edges 76 and 78, which are rectilinear and parallel, interconnect a pair of crescent-shaped side faces 80. The side faces 80 are preferably planar and parallel.

A compact opening 82 penetrates the retainer 32 at a location spaced from its edges. The opening 82 interconnects the front and rear faces 72 and 74, and preferably has a circular cross-sectional shape. In addition, the opening 82 preferably has a shape and cross-sectional size identical to that of the opening 48. The opening 82 is situated such that it is alignable with the openings 68 and 48.

In the same embodiment described with reference to the platform 28 and bracket 30, the distance between the side faces 80 is 2.25 inches. At the front face 72, the distance between the upper and lower edges 76 and 78 is 1.53 inches. The radius of the curved rear face 74 is 0.92 inches. The center of opening 82 is situated equidistant from the side faces 80 and from the edges 76 and 78. The overall thickness of the retainer 32, measured between the front face 72 and the deepest portion of the rear face 74, is 0.49 inches.

The platform 28, bracket 30 and retainer 32 are preferably formed from a strong and durable material, such as steel or aluminum. More preferably, these components are formed from the same such material. In one embodiment, these components are formed from 6061 aluminum alloy.

Assembly of the connector assembly 26 is shown in FIG. 14. The flat rear face 36 of the platform 28 is seated against the flat side wall of a post (not shown). The opening 48 is aligned with a corresponding passage that extends through the post. The base 38 of the bracket 30 is next seated within the concavity 46, such that the opening 68 is aligned with the opening 48. The retainer 32 is next inserted into the channel 60, and the rear face 74 seated against the concave inner surface 56 of the base 54 of the bracket 30. The opening 82 within the retainer 32 is aligned with the openings 68 and 48 as well as with those within the post. A fastener, such as a bolt 84, is inserted through the aligned openings in order to secure the connector assembly 26 to the post. Thus installed, the flat underside of the head of the bolt 84 engages the flat front face 76 of the retainer 32. The end of the bolt 84 projects from the side of the post opposite the platform 28.

After the bolt 84 is installed, the bracket 30 may be swiveled horizontally within the concavity 46 of the platform 28. Because of the elongation of the opening 68, the bolt 84 does not restrain such swiveling until it engages the bracket 30 at an extremity of the opening 68. The convex surface of the rear face 74 of the retainer 32 allows the bracket 30 to swivel horizontally while the components of the connector assembly 26 are maintained in a fully assembled state.

Once the bracket 30 has been positioned at the desired angular position, the connector assembly 26 is restrained against further movement. Restraint is produced by tightening a nut 86 fitted onto the end of the bolt 84.

Once the connector assembly 26 is installed, the end of a rail (not shown) may be inserted into the channel 60 of the bracket 30. The rail is held within the bracket 30 by a fastener, such as a bolt 88, that extends through the aligned fastener openings 70 and through corresponding openings in the rail. The bolt 88 is held in place by a nut 90.

Because it can swivel horizontally, the bracket 30 can be oriented at a range of angles relative to its supporting post. Such a connector assembly 26 allows a single post 14 to support a section 12 that extends at a non-straight angle relative to the next adjacent section 12. Without such an assembly, a pair of posts, rather than a single post, would be needed to form an angled corner in a barrier.

FIG. 15 shows a first section 92 of a barrier 10. Each of the rails 16 is supported by a conventional connector 94. Because the connector 94 does not swivel, the rails 16 extend orthogonally to both of the supporting posts 96 and 98. However, at post 98, connector assemblies 26 have been installed opposite the conventional connectors 94 that hold one end of the first section 92. A single bolt (not shown) penetrates the post 98 and holds both a connector assembly 26 and an opposed connector 94 in place. The connector assemblies 26 permit the post 98 to support an adjacent section that extends at a non-straight angle relative to the first section 92. Thus the single post 98 can support dual sections 12 and form a corner for the barrier 10 as well.

FIG. 16 shows a second section 100 of a barrier 10 that has been supported between posts 98 and 102. As in FIG. 15, connector assemblies 26 have been installed on post 98, and support one end of the second section 100. Conventional connectors 94 have been installed on the post 102, and support the opposite end of the second section 100. The post 102 is a terminal post that supports only a single section. Thus, a terminal plate 104, rather than a connector, is installed on the post 102 opposite each connector 94.

A kit may be formed from one or more of each of the platform 28, bracket 30 and retainer 32. The kit may also include one or more fasteners, such as the bolt 84 and nut 86, that are used to install the connector assembly 26.

Changes may be made in the construction, operation and arrangement of the various parts, elements, steps and procedures described herein without departing from the spirit and scope of the invention as described in the following claims.

The invention claimed is:

1. A kit, comprising:
a platform having a concavity formed therein;
a channel-shaped bracket having a pair of side walls joined by a base, the base having opposed convex and concave surfaces, the convex surface seatable within the concavity of the platform; and
a retainer receivable within the bracket channel and having a convex surface seatable within the concave surface of the base of the bracket.

2. The kit of claim 1 in which the concavity is complementary to the curved surface of a sector of a right circular cylinder.

3. The kit of claim 1 in which the retainer has the shape of a sector of a right circular cylinder.

4. The kit of claim 1 in which at least one of the bracket side walls has a fastener opening formed therein.

5. The kit of claim 1 in which alignable openings are formed in the platform, bracket and retainer.

6. The kit of claim 5, further comprising:
a fastener extendable through the aligned openings of the platform, bracket and retainer.

7. The kit of claim 5 in which the openings in the platform and retainer are compact.

8. The kit of claim 5 in which the opening within the bracket extends along a curved path within its base.

9. The kit of claim 5 in which the opening in the bracket is an elongate slot formed within its base.

10. The kit of claim 9 in which the openings in the platform and retainer are compact.

11. A barrier comprising:
a post having a side wall;
a platform having a concavity formed therein, the platform is supported by the post side wall;
a channel-shaped bracket having a pair of side walls joined by a base, the base having opposed convex and concave surfaces, the convex surface seated within the concavity of the platform;
a retainer received within the bracket channel with its convex surface seated within the concave surface of the base of the bracket; and a rail supported by the side walls of the bracket.

12. The barrier of claim 11 in which the concavity is complementary to the curved surface of a sector of a right circular cylinder.

13. The barrier of claim 11 in which the retainer has the shape of a sector of a right circular cylinder.

14. The barrier of claim 11 in which at least one of the bracket side walls has a fastener opening formed therein.

15. The barrier of claim 11 in which aligned openings are formed in the platform, bracket and retainer.

16. The barrier of claim 15, further comprising:
a fastener extending through the aligned openings of the platform, bracket and retainer.

17. The barrier of claim 15 in which the openings in the platform and retainer are compact.

18. The barrier of claim 15 in which the opening within the bracket extends along a curved path within its base.

19. The barrier of claim 15 in which the opening in the bracket is an elongate slot formed within its base.

20. The barrier of claim 19 in which the opening in the bracket is an elongate slot formed within its base.

* * * * *